March 10, 1925.
K. ARLIN
TRANSMISSION MECHANISM
Filed Jan. 17, 1924
1,529,535
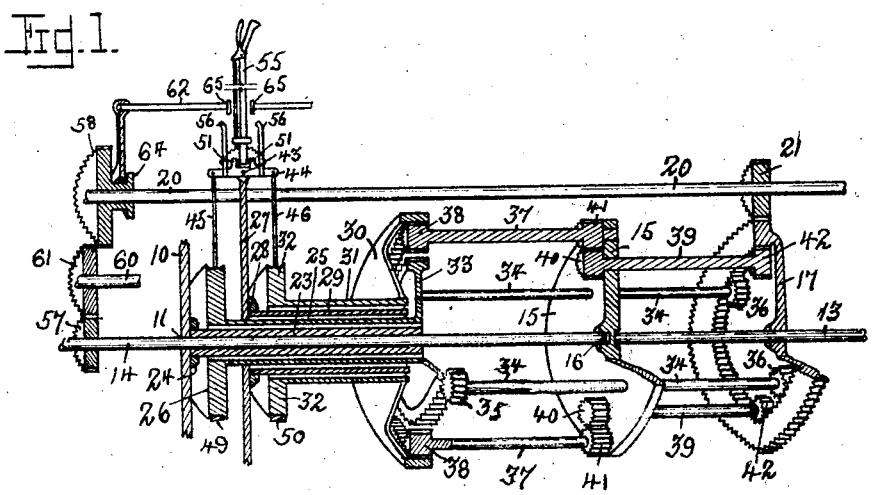
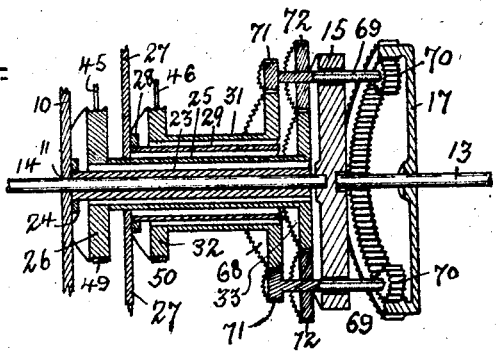
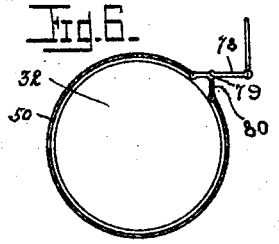
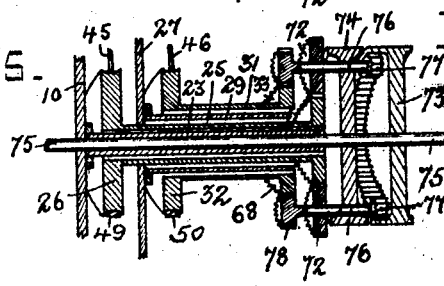
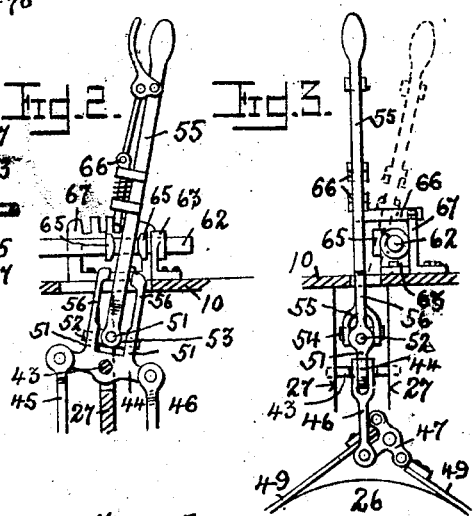
KARL ARLIN INVENTOR.
BY Geo. P. Kimmel ATTORNEY Patented Mar. 10, 1925.

1,529,535

UNITED STATES PATENT OFFICE.

KARL ARLIN, OF PALMER, MASSACHUSETTS.

TRANSMISSION MECHANISM.

Application filed January 17, 1924. Serial No. 686,878.

*To all whom it may concern:*

Be it known that I, KARL ARLIN, a citizen of Finland, residing at Palmer, in the county of Hampden and State of Massachusetts, have invented certain new and useful Improvements in Transmission Mechanism, of which the following is a specification.

This invention relates to variable speed transmission mechanism, and has for one of its objects to improve the construction and increase the efficiency and utility of devices of this character.

Another object of the invention is to provide a device of this character wherein no separate clutch is required to transmit the power from a motor to a driven element, for instance from the motor to the rear axle of a motor driven vehicle.

With these and other objects in view the invention consists in certain novel features of construction as hereinafter shown and described and then specifically pointed out in the claims, and in the drawings illustrative of the preferred embodiment of the invention, Figure 1 is a longitudinal section.

Figure 2 is a detail illustrating the construction of the alternating brake operating mechanism and the reversing mechanism.

Figure 3 is a side elevation of the parts shown in Figure 2.

Figure 4 is a view similar to Figure 1 illustrating a modification in the construction.

Figure 5 is a view similar to Figures 1 and 4, illustrating another modification in the construction.

Figure 6 is a detail of a view of a modified construction of one of the brake operating devices.

The improved device may be employed wherever a variable transmission gearing is required, but is designed more particularly for use in motor driven vehicles to transmit motion from the motor to the rear axle, but it is not desired to limit the use of the device to any specific mechanism, as it may be readily adapted for use in connection with any mechanism requiring a variable speed for reversing transmission. The improved device comprises a supporting shell or casing 10 with bearings in the ends to respectively support shaft sections, one of which, indicated at 13, may be the transmission shaft which leads to the differential gear of the rear axle of a motor driven vehicle, while the other portion represented at 14, may be the transmission shaft of the vehicle. The confronting ends of the shaft sections 13 and 14 are stepped from opposite sides in a disk member 15, the section 14, and disk 15 being connected as by a pin 16, to rotate together, while the section 13 rotates within the disk. Coupled to the shaft section 13 and rotative therewith is a double gear wheel 17 having gear teeth both internally and externally of the rim.

Supported in the ends of the casing 10 is a shaft 20 carrying a gear 21 in constant engagement with the external teeth of the gear 17.

Supported by the shaft section 14 is a bearing sleeve 23, the outer end of the sleeve being attached to the casing 10 adjacent the shaft section 14 as at 24, and thus held stationary, and forming an elongated bearing.

Surrounding the bearing sleeve 23 and rotative thereon is an intermediate sleeve 25 which bears at one end against the flange 24 of the bearing sleeve. A brake drum 26 is attached to the sleeve 25 and rotates therewith.

Disposed within the casing 10 and spaced from one end thereof, is a partition or diaphragm 27, and attached at 28 to the partition is a stationary spacing sleeve 29.

A relatively large internal gear 30 is disposed within the casing 10 and formed with a relatively long hub 31 rotatively engaging the spacing sleeve 29. Attached to the hub 31 of the gear 30 is another brake drum 32.

Attached to the intermediate rotative sleeve 25 and rotative therewith is a gear 33 somewhat smaller than the gear 30 and operative within the same but not engaged therewith.

Supported for rotation through the disk 15 are shafts 34 at diametrically opposite points and each provided with a gear pinion 35 at one end engaging the gear 33, and each with gear pinion 36 at the other end engaging the internal teeth of the member 17.

Stepped at one end at diametrically opposite points in the disk 15 are short shafts 37, each carrying a gear pinion 38 at one end constantly engaging the internal gear 30.

Rotative through the disk 15 are other shafts 39 at diametrically opposite points and each having a gear pinion 40 at one end in constant engagement with a like gear pinion 41 on the short shafts 37. Mounted on each of the short shafts 39 is a gear pinion 42 in constant engagement with the internal teeth of the gear 17.

Pivoted at 43 in the partition 27 is a lever arm 44, the latter having pull rods 45 and 46 coupled respectively thereto at its outer ends. The pull rods are coupled by bell crank levers one of which is shown at 47 to the brake bands 49 and 50 of the brake drums 26 and 32. The lever arm 44, the bell crank levers 47 and the pull rods 45 and 46 are so arranged that the brake bands will be alternately applied as the bell crank lever is actuated.

Spaced lugs 51 extend from the arm 43, and pivoted at 52 between the lugs is a coupling member 53, and pivoted at 54 in the coupling member is an operating lever 55.

The lugs 51 are extended as at 56 and terminate at opposite sides of the lever 55, and in position to be engaged thereby when the lever is in one position and moved to the right or left and thus alternately swing the arm 44 upon its pivot 43 and correspondingly operate the brake bands.

Mounted on the shaft section 14 and rotative therewith, is a gear 57, and slidably mounted on the shaft 20 is a gear 58, the latter rotative with the shaft 20 as by a feather key or the like.

Mounted on a stud 60 is an idler gear 61 in constant engagement with the gear 57. The gear 58 being slidable on the shaft 20 is engageable with the idler gear 61 when in one position and disengaged therefrom when in another position, as will be obvious.

Means are provided for shifting the gear 58 by the movement of the lever 55, toward one position, and comprises a movable shipper rod 62 arranged to engage a channelled shipper collar 64 on the gear 58. Formed on the rod 62 are spaced stops 65 between which the lever 55 operates when in another position.

The lever 55 is provided with a pawl device, indicated conventionally at 66, and operating over a notched segment 67 attached to the casing 10, to enable the lever to be locked in adjusted position. The pawl 66 is of sufficient length to remain in contact with the notched segment 67 no matter in what position the lever may be placed.

By this arrangement when the lever 55 is in position between the terminals of the extensions 56 as shown in Figures 1, 2, and 3, and moved to the right, the arm 44 will be tilted to the right and cause the pull rod 45 to apply the brake band on the drum 26 and release the band from the other drum 32, and then when the lever 55 is moved to the left the brake band will be applied to the drum 32 and released from the drum 26.

When the lever 55 is in vertical position, as in full lines in Figures 1, 2, and 3, it will be disengaged from the stops 65 and disposed between the extensions 59, and when moved on its pivot 54 into the position shown by dotted lines in Figure 3, the lever will be released from the extensions 56 and disposed between the stops 65.

The shafts 34, 37 and 39 rotate freely in the disk 15, and the gear pinions 36 and 42 engage the internal teeth of the gear 17.

When the lever 55 is in position between the terminals of the extensions 56 and moved to the right it engages the extension 56 at the right and applies the brake band 49 to the drum 26 and holds the sleeve 25 and gear 33 from rotation, but leaves the drum 32, the sleeve 31 and gear 30 free to be rotated at relatively slow speed through the coaction of the shaft 13, gear 17, pinions 42—42—40—41 and 38.

When the greater speed is desired, the lever 55 is moved to the left and engages the extension 56 at the left and applies the brake band 50 to the drum 32 and holds the sleeve 31 and gear 30 from rotation, but leaves the drum 26 and sleeve 25 and gear 33 free to be rotated at relatively high speed through the coaction of the shaft 13, gear 17, pinions 36 and 35 and shafts 34 and gear 33.

When the lever 55 is in the position shown by dotted lines in Figure 3, and disconnected from the extensions 56, the brake bands on both the drums 26 and 32 will be released and the gearing associated therewith run idle, and when the lever 55 is in either of its two positions for high or slow speed, the shaft 20 with its gears 21 and 58 will run idle.

In Figures 4 and 5 a modified construction is shown in which the parts 13, 14, 15, 23, 26, 27, 28, 29, 31 and 32 are the same as in the structure shown in Figure 1. The speed changing and reversing mechanism will also be associated with the modified structure shown in Figures 1, 2 and 3, but it is not deemed necessary to show these parts in the modified structure. In the modified structure the internal gear 30 is replaced by an external gear 68 fast to the sleeve 31.

Extending through the disk 15 at diametrically opposite points are short shafts 69 each carrying a pinion 70 at one end engaging the internal teeth of the gear 17, and a pinion 71 at the other end engaging the gear 68. In the modified structure each of the short shafts 69 is provided with a gear 72 engaging the gear 33.

In Figure 5 another modified structure is shown in which the parts 23, 24, 25, 26, 27, 28, and 29 are the same as in the structure shown in Figure 1. In the latter modified structure the double gear 17 is replaced by a single internal gear 73, and the disk 15 replaced by a similar disk 74. The shaft sections 13 and 14 are replaced by a single through shaft 75 rotative through the disk 74. Short shafts 76 like the short shafts 69 are employed, and carry gear pinions 77 and 78 like the gear pinions 70 and 71 and respectively engaging the teeth of the gear 73 and the gear 33. In the latter modified structure the short shafts 76 carry gears 72 the same as in the modified structure shown in Figure 4.

In Figure 6 a modified construction of one of the brake band applying devices is shown comprising pull lever 78 pivoted at 79 intermediate the ends and pivoted at one end to one end of the brake band 49 or 50 as the case may be, and coupled by a link 80 to the other end of the band.

Having thus described the invention, what is claimed as new is:—

1. In an apparatus of the class described, a drive shaft, an inner bearing sleeve rotative relative to said drive shaft, a brake drum attached to said inner bearing sleeve, an external gear attached to said inner bearing sleeve, a disk member attached to rotate with said drive shaft, an external bearing sleeve rotative relative to said internal bearing sleeve, a brake drum attached to said external bearing sleeve, an internal gear attached to said external bearing sleeve, a plurality of shafts rotative through said disk member, a driven shaft, means for coupling said plurality of shafts to operate said driven shaft, gear pinions carried by the shafts of said disk and engaging the gears carried by said sleeves, and means for alternately applying gripping elements to said brake drums.

2. In a device of the class described, a support, a drive shaft rotative through said support, a disk rotative with said drive shaft, a driven shaft seated at one end in said disk, a gear rotative with said driven shaft, coacting brake drums rotative relative to said drive shaft and each having an encompassing brake band, a gear connected to one of said brake drums, a gear connected to the other of said brake drums, a shaft mounted for rotation in said disk and having pinions at the ends, one of which engages the gear of said driven shaft, a shaft mounted for rotation in said disk and carrying pinions respectively engaging the other pinion of the disk carried shaft and the gear associated with one of said brake drums, a shaft mounted for rotation through said disk and carrying gear pinions engaging respectively with the gear carried by said driven shaft and the gear associated with the other brake drum, and means for alternately stopping the motion of said brake drums.

3. In a device of the class described, a support, a drive shaft rotative through said support, a disk rotative with said drive-shaft, a driven shaft seated at one end in said disk, a gear rotative with said driven shaft, coacting brake drums rotative relative to said drive shaft and each having an encompassing brake band, a gear connected to one of said brake drums, a gear connected to the other of said brake drums, a shaft mounted for rotation in said disk and having pinions at the ends, one of which engages the gear of said driven shaft, a shaft mounted for rotation in said disk and carrying pinions respectively engaging the other pinion of the disk carried shaft and the gear associated with one of said brake drums, a shaft mounted for rotation through said disk and carrying gear pinions engaging respectively with the gear carried by said driven shaft and the gear associated with the other brake drum, a rocker arm mounted in said support, a coupling means between said rocker arm and said brake bands, projections extending from said rocker arm in spaced relation, and a lever arm swingingly coupled relative to said rocker arm and adapted to be alternately engaged with said projections to alternately apply strain to said brake bands.

4. In an apparatus of the class described, a drive shaft section, a driven shaft section, a disk coupled to the drive shaft section, an inner bearing sleeve rotative relative to the drive shaft, a brake drum rotative with the inner bearing sleeve, a gear rotative with the inner bearing sleeve, an outer bearing sleeve rotative relative to the inner bearing sleeve, a brake drum rotative with the outer bearing sleeve, a gear rotative with the outer bearing sleeve, a gear rotative with the driven shaft section, a plurality of inner counter shafts carried by said disk, gear pinions carried by said inner counter shafts and respectively engaging the gears of the bearing sleeves and the gear of the driven shaft, means for alternately applying gripping elements to said brake drums, an outer counter shaft, a gear pinion carried by said outer counter shaft and engaging the gear of said driven shaft, and means for coupling said outer counter shaft to the drive shaft.

5. In a device of the class described, a support, a drive shaft rotative through said support, a disk rotative with said drive shaft, a driven shaft seated at one end in said disk, a ring gear having internal and external teeth and rotative with said driven shaft, coacting brake drums rotative relative to said drive shaft, a gear connected to one of said brake drums, a gear connected to the other of said brake drums, a shaft mounted for rotation in said disk and having pinions at the ends one of which engages the internal teeth of the ring gear, a shaft mounted for rotation in said disk and carrying pinions respectively engaging the other pinion of the disk carried shaft and the gear associated with one of said brake drums, a shaft mounted for rotation through said disk and carrying gear pinions engaging respectively with the internal teeth of the ring gear and the gear associated with the other brake drum, a reversing shaft, a gear carried by said drive shaft, an idler gear in constant engagement with the gear of said drive shaft, a gear slidable on said reversing shaft and adapted to be engaged with and disengaged from said idler gear, a sliding member having spaced stops, coupling means between said sliding members and the sliding gear, a rocker arm mounted in said support, coupling means between said rocker arm and said brake bands, projections extending from said rocker arm in spaced relation, a lever arm swinging both in alinement with and transversely of said projections and adapted to be alternately disposed between the projections and between the spaced stops of the slidable member, and a gear mounted on the reversing shaft and engaging the external teeth of the ring gear, whereby the motion between the drive shaft and driven shaft may be reversed and the speed of the driven shaft controlled by the operation of one single lever.

6. In a device of the class described, a support, an inner bearing sleeve attached to said support, a drive shaft rotative through said inner bearing sleeve, a disk member rotative with said drive shaft, a driven shaft seated at one end in said disk, a gear rotative with said driven shaft, an outer brake drum having a tubular shaft rotative on said inner bearing sleeve, a gear carried by said tubular shaft, an outer bearing sleeve attached to said support, an inner brake drum having a tubular shaft rotative on the outer bearing sleeve, a gear rotative with said driven shaft, a shaft mounted for rotation in said disk and having pinions at the ends one of which engages the gear of said driven shaft, a shaft mounted for rotation in said disk and carrying pinions respectively engaging the other pinion of the disk carried shaft and the gear associated with one of said brake drums, a shaft mounted for rotation through said disk and carrying gear pinions engaging respectively with the gear carried by said driven shaft and the gear associated with the other brake drum, and means for alternately stopping the motion of said brake drums.

In testimony whereof, I affix my signature hereto.

KARL ARLIN.